Dec. 17, 1968 B. G. UTLEY 3,417,236
PARALLEL BINARY ADDER UTILIZING CYCLIC CONTROL SIGNALS
Filed Dec. 23, 1964 3 Sheets-Sheet 1

INVENTOR.
BRIAN G. UTLEY
BY Fraser and Bogucki
ATTORNEYS

INVENTOR.
BRIAN G. UTLEY

BY Fraser and Bogucki

ATTORNEYS

PARALLEL BINARY ADDER UTILIZING CYCLIC CONTROL SIGNALS

Filed Dec. 23, 1964

3 Sheets-Sheet 3

INVENTOR
BRIAN G. UTLEY

BY Fraser and Bogucki

ATTORNEYS

United States Patent Office 3,417,236

Patented Dec. 17, 1968

3,417,236

PARALLEL BINARY ADDER UTILIZING CYCLIC CONTROL SIGNALS

Brian G. Utley, San Jose, Calif., assignor to International Business Machines Corporation, Armonk, N.Y., a corporation of New York Filed Dec. 23, 1964, Ser. No. 420,568
11 Claims. (Cl. 235—175)

This invention relates to decision circuitry for digital data processing systems and in particular to a parallel binary adder which may be used for performing both arithmetic and logic functions.

Modern digital computers are based upon circuits which are capable of performing arithmetic functions, such as addition and subtraction, and logic functions such as AND, OR, Exclusive OR, Exchange, Shift Left and similar operations. Circuits for these functions should be as economical and fast as feasible, because they are largely determinative of the cost and speed of a given data processing system. Principles underlying the design of circuits for performing selected ones of the mentioned functions have been developed, and a discussion thereof may be found in "Arithmetic Operations in Digital Computers" by R. K. Richards (D. Van Nostrand Co., 1955). For example, the functions of binary addition and subtraction are discussed in chapter 4 of the cited text. Particular circuit arrangements are known in the art for performing both addition and subtraction of binary numbers by suitable modification of a parallel binary adder so that it may accomplish subtraction by the addition of a complement of one of the numbers. Such a circuit is disclosed, for example, in Patent 3,056,552 of E. G. Wagner. However, such circuits as are known in the prior art are usually directed primarily to the accomplishment of only one or perhaps two of the variety of arithmetic and logic functions which a computer is called upon to perform. Thus the use of such circuits in a binary digital computer requires a plurality of special purpose circuits to accommodate the various functions to be performed. This undesirably complicates and multiplies the circuitry which is employed, and in some cases increases the time required for the computer to go through a cycle of operation.

It is therefore a general object of the present invention to provide an improved circuit of the type which may be used in computers for the performance of a plurality of arithmetic and logic functions.

It is a particular object of the invention to provide an improved and simplified parallel binary adder which may be used for performing both addition and subtraction by a partial sum or partial difference type of operation.

It is a further object of the present invention to provide a parallel binary adder having the capability of performing both arithmetic and logic functions with respect to a pair of binary numbers.

It is a further object of the present invention to provide a parallel binary adder with a reduced amount of individual circuitry for performing add and subtract operations.

In brief, particular arrangements in accordance with the invention relate to a parallel binary adder for producing the sum of two significant numbers by one or more of a series of register change cycles depending on the pattern of carries which is generated. The arrangements may also be used in conjunction with gating circuits for performing the subtraction, AND, OR, Exclusive OR, Exchange and Shift Left logic functions. One particular example of the invention comprises a first register Y for receiving an augend and a second register X for receiving an addend, with the registers being interconnected and controlled cyclically so that on each successive cycle the partial sum of two numbers originally placed in the two registers replaces the number previously stored in the Y register and the carries, if generated, replace the number stored in the X register. As long as carries are generated, additional cycles are used to add the carries to the partial sums. A ripple carry technique is employed to reduce the equipment required; however, unlike many previous ripple carry schemes, the number of carry cycles here employed is not constant, but depends entirely on the pattern of the generated carries. At the point where no further carries are generated, the add cycle is terminated by the blocking of further add control pulses so that the addition is complete and the final sum is found in the Y register.

In accordance with another aspect of the invention, an arrangement is provided, using the same system of X and Y registers, to provide a parallel binary subtracter which will perform the subtraction function by partial difference subtraction without the need for resorting to converting to a complement. In this particular arrangement in accordance with the invention, the partial difference subtraction operations are performed in successive cycles under the control of a cyclic subtract signal which is blocked, or suppressed, when the point is reached at which no further borrows are generated and the final difference is stored in the Y register.

In accordance with a further aspect of the present invention, individual logic circuits utilizing the same arrangement of X and Y registers as described above are provided with various interconnections for performing respectively the logic functions of AND, OR, Exclusive OR, binary Shift Left, and Exchange with respect to a pair of binary numbers. These individual circuits are combined in one particular arrangement in accordance with the invention in a composite circuit which has the capabilities of performing all of the above-recited arithmetic and logic functions on demand in a single circuit. A considerable advantage is realized from the inclusion of such a circuit in accordance with the invention in a binary digital computer, since the circuit provides the recited capabilities with the addition of very little circuitry over what is already included in the number registers. For example, the X register of the present arrangement corresponds to the memory buffer register which is conventionally included as a computer element, and the Y register of the invention corresponds to the accumulator register which is also included as a computer element. Thus it may be seen that, through the use of the present invention, considerable versatility may be added to the register stages of a computer by the inclusion of very little auxiliary hardware, thus realizing a substantial reduction in the actual circuitry involved because the composite circuit of the invention replaces a number of individual, special purpose circuits.

The foregoing and other objects, features and advantages of the invention will be apparent from the following more particular description of preferred embodiments of the invention, as illustrated in the accompanying drawings.

Figure 1:
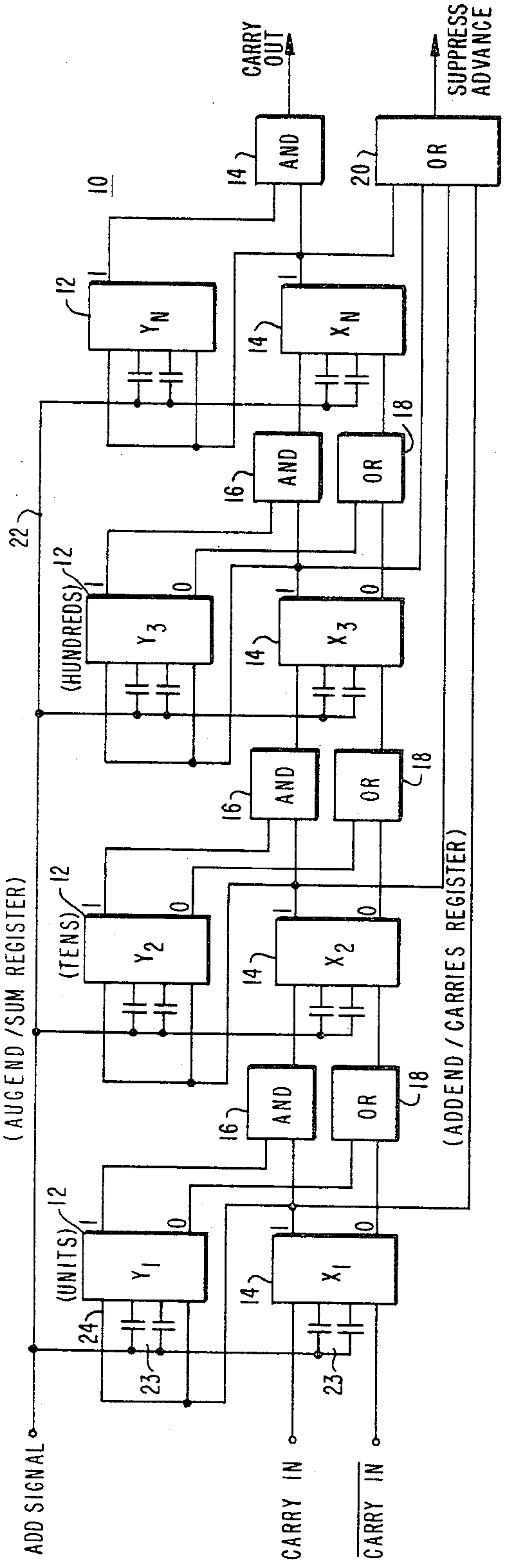
FIG. 1 is a block diagram of a particular arrangement of a parallel binary adder in accordance with the invention, shown in somewhat generalized form.

In a parallel binary adder in accordance with the invention as shown in FIG. 1, there are an augend/sum register comprising a plurality of individual Y register stages 12, designated $Y_1$, $Y_2$, $Y_3$ . . . $Y_n$, and an addend/carries register comprising X register stages 14, designated $X_1$, $X_2$, $X_3$ . . . $X_n$. Both the X and Y registers of each stage are interconnected to the succeeding stage through AND gates 16 and OR gates 18 and also are interconnected within a stage to provide a necessary gating function. Add signals are applied to each stage from a lead 22 and in each stage are coupled on an AC basis, as through capacitors 23, to corresponding gate inputs. Each one of the X and Y registers comprises a conventional circuit which may be a trigger or flip-flop having both binary 1 and binary 0 complementary outputs which are maintained until a suitable input signal causes the register stage to change state. Each gate input is controlled by its adjacent gate control lead such as 24 by means of conventional gate circuitry (not shown) within an individual register stage 12 or 14. Signals from the 1 output of each X register stage are applied to an OR gate 20 as a suppress advance signal, which serves to prevent the data processor from advancing to the next substep in a program. The suppress advance signal is maintained as long as any X register stage 14 is in the binary 1 state.

In the operation of the parallel binary adder of FIG. 1, a pair of numbers A, of the form $a_1$, $a_2$, $a_3$ . . . $a_n$, and B, of the form $b_1$, $b_2$, $b_3$ . . . $b_n$, are entered in the respective Y and X registers by means that may be of any conventional form, and have accordingly not been shown in FIG. 1. For the purposes of this example, let A be the augend and B be the addend. Thereafter, cyclic Add Signals are applied. As the first Add Signal arrives, it will cause each Y trigger 12 to change state if its corresponding X trigger 14 contains a 1, that is, is in the binary 1 state. The Y register now contains the partial result $C_1$. At the same time, the Add Signal causes the X triggers 14 to stay on or to be turned on (in the binary 1 state) if the X and Y triggers of the preceding stage were both in the binary 1 state in the preceding cycle. It should be noted that for the $X_1$ register stage, namely the trigger 14 in the units order position, $X_1$ is turned off if not already off, by making the $\overline{\text{carry in}}$ effective. If either or both of the X and Y triggers were off, then the X trigger is turned off (assumes the binary 0 state). In this manner the carries are generated and stored in the X register as a factor $F_1$. The cycle is repeated until the X register contains 0 ($F_n$); at this time the suppress advance signal from the OR gate 20 is terminated, thereby permitting the processor to continue its operation. No further Add Signals are received, and the sum of the two numbers A and B is stored in the Y register. A summary of this operation is as follows:

$$
\begin{array}{ll}
A & \\
+B & \\
\hline
C_1 & \text{partial result} \\
+F_1 & \text{carries as a result of adding } A+B \\
\hline
C_2 & \text{partial result \#2} \\
+F_2 & \text{carries as a result of adding } C_1+F_1 \\
\hline
C_3 & \text{partial result \#3} \\
\cdot & \\
\cdot & \\
\cdot & \\
\hline
C_n & \text{partial result \#}n \text{ where } n=\text{number of the operation} \\
 & \quad \text{when } F=0
\end{array}
$$

Operation ends when $F_n=0$

Each partial result C is stored in the Y register for subsequent addition operation. The operation terminates at any point when the carries are 0; the number of cycles in the operation is usually less than the number of register stages employed and in no event will be greater than the number of stages. A specific example showing the addition operation for two specific binary numbers, $A=0100111101$ and $B=0000001001$ is as follows:

$$
\begin{array}{rl}
0100111101 & A \\
+\ 0000001001 & B \\
\hline
0100110100 & C_1 \\
+\ 0000010010 & F_1 \\
\hline
0100100110 & C_2 \\
+\ 0000100000 & F_2 \\
\hline
0100000110 & C_3 \\
+\ 0001000000 & F_3 \\
\hline
0101000110 & C_4=C_n \\
0000000000 & F_4=F_n \\
\hline
\end{array}
$$

The rules of operation for this circuit of FIG. 1 are: if $X_n=1$, change $Y_n$; if $Y_n$ and $X_n=1$, set $X_{n+1}$; if $Y_n$ or $X_n=0$, reset $X_{n+1}$; and if $X_n=1$, provide suppress advance signal.

Figure 2:
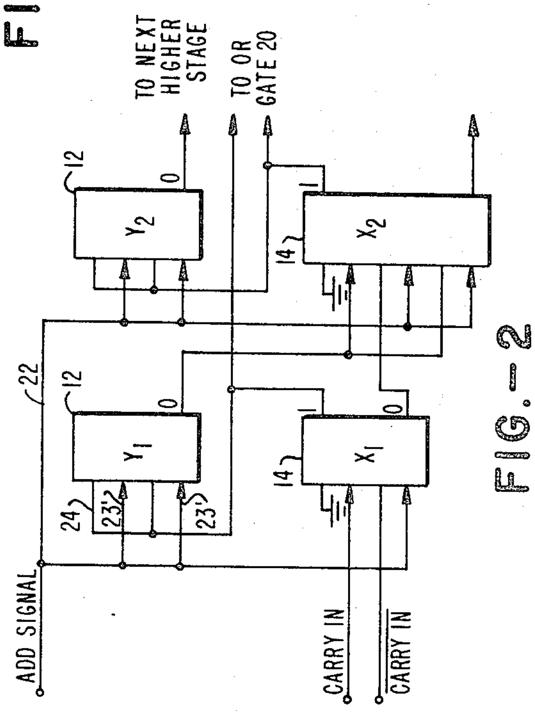
FIG. 2 is a block diagram of a second particular arrangement of binary adder in accordance with the invention, shown in more simplified form.

FIG. 2 illustrates a parallel binary adder arrangement which is operated in a fashion similar to that of FIG. 1, but is somewhat simpler in configuration by virtue of the elimination of the AND and OR gates 16 and 18. In FIG. 2, the AC inputs to the gates of the respective register stages are indicated by the arrows 23'. It will be understood, however, that these correspond to the capacitor inputs 23 of FIG. 1. It will be noted that no use is made of the binary 1 output of the Y triggers. Instead, the binary 0 outputs of the Y triggers are coupled to the AC set input of the next higher order X trigger. Logically this indicates that the Y trigger is changing from the binary 1 state to a binary 0 state and therefore both it and its corresponding X trigger must have been in the binary 1 state. The binary 0 outputs of both the X and Y triggers of a given stage are used to control separate gates on the reset side of a succeeding X trigger. Thus if either $X_n$ or $Y_n=0$, the $X_{n+1}$ trigger is reset to 0 by the succeeding Add Signal. The rule for operating the circuit of FIG. 2 is: when $Y_n$ changes from 1 to 0 set $X_{n+1}=1$. The operation of the circuit of FIG. 2 corresponds to the illustrative examples set forth above with respect to FIG. 1.

Figure 3:
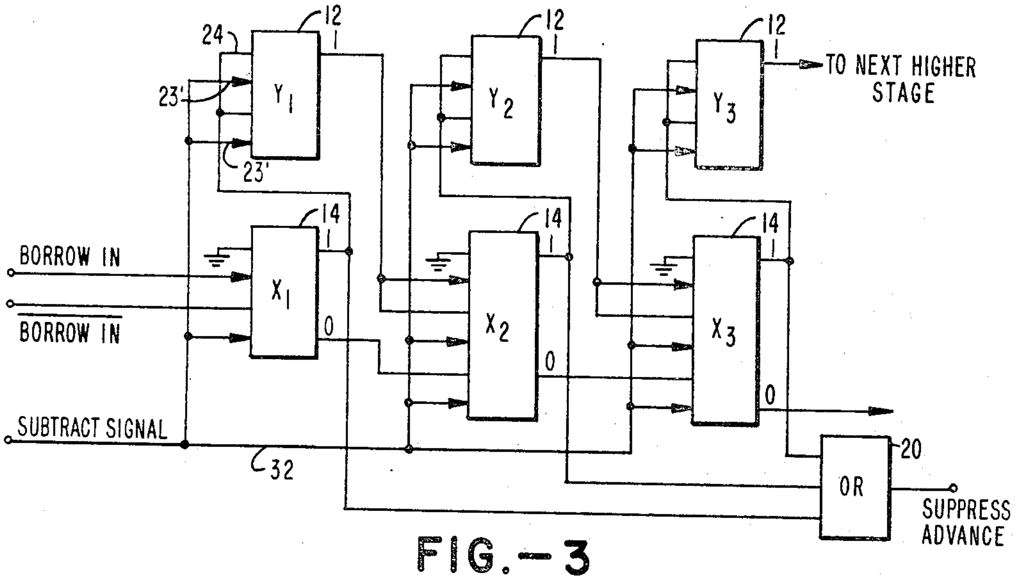
FIG. 3 is a block diagram of a particular arrangement of a binary subtracter in accordance with the invention.

FIG. 3 represents one particular arrangement of a parallel binary subtracter in accordance with the invention. A comparison of FIG. 3 with FIG. 2 shows that the two circuits correspond in virtually every respect except that the binary 1 output of the Y triggers is employed to control the succeeding X trigger instead of the binary 0 output. The Subtract Signal is applied over a lead 32, corresponding to the Add Signal on the lead 22 of FIG. 2. Borrow in and $\overline{\text{borrow in}}$ signals are applied in place of the carry in and $\overline{\text{carry in}}$ signals of FIG. 2. The rule for the operation of the circuit of FIG. 3 is: when $Y_n$ changes from 0 to 1, set $X_{n+1}=1$. The only difference between this statement and the rule controlling the operation of the circuit of FIG. 2 is the change of Y from 1 to 0 to from 0 to 1. A particular advantage of the operation of the binary subtracter of FIG. 3 resides in the fact that it is unnecessary to perform any complementing operation in order to achieve subtraction. The subtract operation is performed entirely by true partial difference subtraction. The circuit of FIG. 3 operates in accordance with the following example in which it is assumed for purposes of illustration that a binary number $B=00110$ is to be subtracted from a binary number $A=01101$.

| | | |
|---|---|---|
| A | 01101 | |
| − B | 00110 | |
| $A_1$ | 01011 | Partial difference. |
| − $B_1$ | 00100 | Partial borrows. |
| $A_2$ | 01111 | Partial difference. |
| − $B_2$ | 01000 | Partial borrows. |
| $A_3$ | 00111 | Partial difference. |
| $B_3$ | 00000 | No further borrows, end operation. |

The number A is initially stored in the Y register whereas the number B is initially stored in the X register by means which are not shown in FIG. 3. It will be observed that in the operation of the subtracter of FIG. 3, each partial difference is developed in its corresponding $Y_n$ trigger by changing the state thereof if a binary 1 is present at the output of the corresponding $X_n$ trigger. A borrow is established in the succeeding $X_{n+1}$ trigger if a given $Y_n$ trigger changes to the binary 1 state.

In addition to its use for subtraction, the binary subtracter of FIG. 3 may be employed to perform the function of binary Shift Left. For this purpose, the number to be shifted is inserted in the X register by means not shown in FIG. 3 and the Y register is set to 0. At the end of the first subtract cycle, the original number now appears in the X register but shifted left by one position. An example of this operation for shifting the binary number 011010 is as follows:

| | | |
|---|---|---|
| | Y | 000000 |
| Cycle 1 | X | 011010 |
| | Y | 011010 |
| Cycle 2 | X | 110100 |

Thus the number in the X register at cycle 1 appears in the X register at cycle 2 but shifted left by one position.

Figure 4:
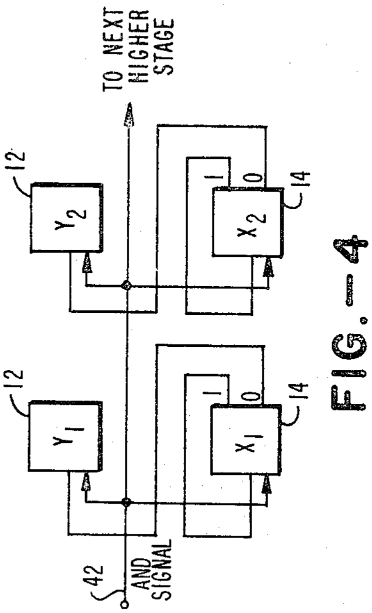
FIG. 4 is a block diagram of a particular portion of one arrangement in accordance with the invention, illustrating its operation as an AND logic circuit.

FIG. 4 illustrates an arrangement of X and Y register stages for operation as a logic circuit to perform the AND function between numbers stored respectively in the X and Y registers. The AND result is found in the Y register and the operation is performed according to the following table:

TABLE I

| | | | | |
|---|---|---|---|---|
| Y | 0 | 1 | 1 | 0 |
| X | 1 | 0 | 1 | 0 |
| $Y_1$ | 0 | 0 | 1 | 0 |

From Table I it can be seen that each $Y_n$ trigger must be set to a binary 0 state unless the corresponding $X_n$ trigger contains a binary 1. As shown in FIG. 4, the binary 1 output of the $X_n$ trigger 14 is applied to control the reset input of $X_n$, and the binary 0 output of the $X_n$ trigger 14 is applied to control the reset input of the corresponding $Y_n$ trigger 12. An applied AND signal on a lead 42 is then gated into each X and Y trigger stage in accordance with the described interconnections.

Figures 5, 6:
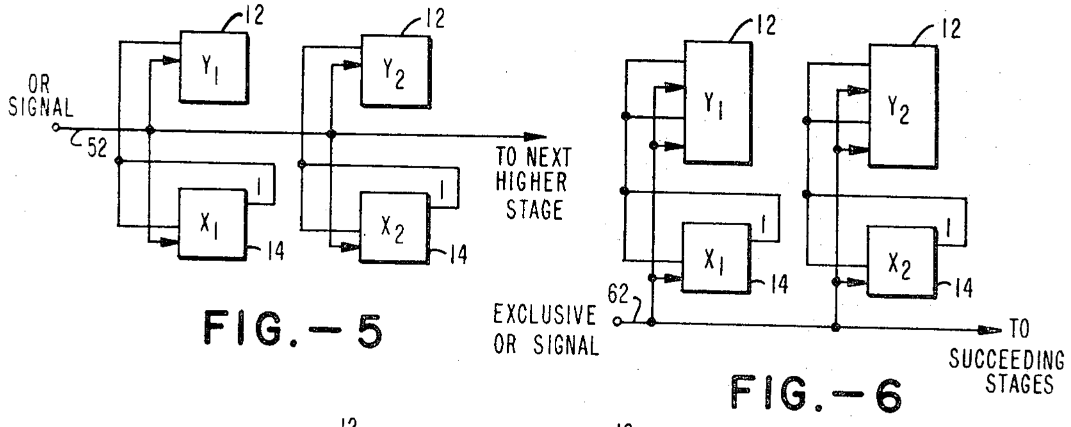
FIG. 5 is a block diagram of a corresponding portion of one arrangement of the invention, showing its use as an OR logic circuit.
FIG. 6 is a block diagram of a portion of one arrangement of the invention, showing its operation as an Exclusive OR circuit.

FIG. 5 represents a particular configuration of interconnecting Y register stages 12 and X register stages 14 interconnected to perform a logical OR function between corresponding orders of the X and Y registers. The OR result is found in the Y register and is formed according to the following table:

TABLE II

| | | | | |
|---|---|---|---|---|
| Y | 0 | 1 | 1 | 0 |
| X | 1 | 0 | 1 | 0 |
| Y | 1 | 1 | 1 | 0 |

It can be seen in FIG. 5 that the binary 1 output of $X_n$ trigger 14 is coupled to produce both the setting of the corresponding $Y_n$ trigger 12 and the resetting of the same $X_n$ trigger 14 by an OR signal applied on a lead 52. This produces the result that any binary 1 state in either of the X and Y triggers of a given stage is reflected in the Y trigger for that stage.

Both the AND and OR functions apply to an operation within an individual stage and may proceed simultaneously for as many stages as are contained in the X and Y registers.

FIG. 6 represents an arrangement of Y triggers 12 and X triggers 14 for performing the logic function of Exclusive OR with respect to binary members stored in the respective registers. This function is performed upon each order of the X and Y registers in accordance with the following table:

TABLE III

| | | | | |
|---|---|---|---|---|
| Y | 0 | 1 | 1 | 0 |
| X | 1 | 0 | 1 | 0 |
| Y | 1 | 1 | 0 | 0 |

Exclusive OR signals are applied via a lead 62 and the X and Y stages of a given order are interconnected so that the binary 1 state of the X trigger 14 permits a change of state of the corresponding Y trigger 12 and the resetting of the X trigger 14 in response to the Exclusive OR signal. It can be seen that the operation of this circuit utilizes the same functions as those of addition and subtraction but without carry or borrow.

Figure 7:
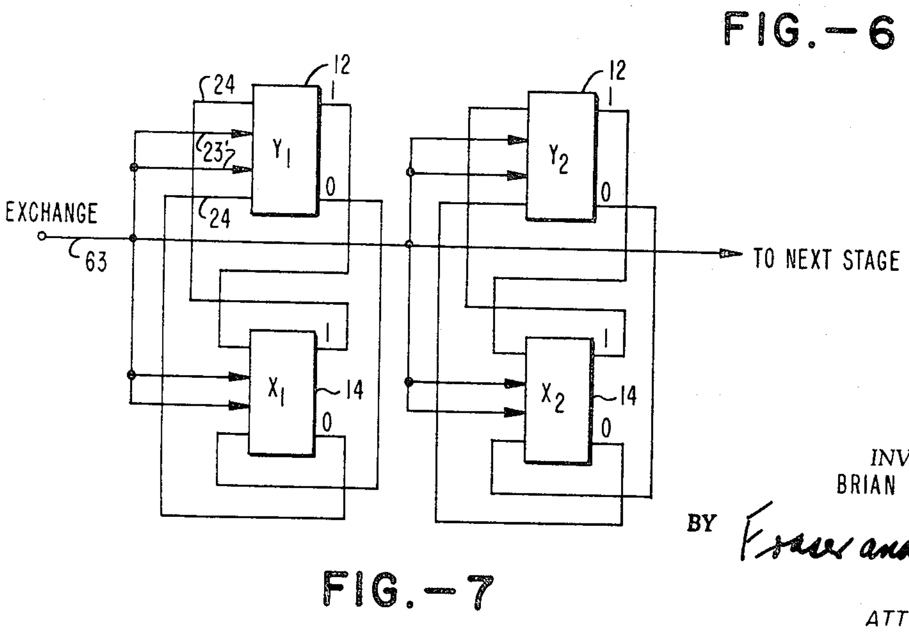
FIG. 7 is a block diagram of a portion of one arrangement of the invention, showing its operation as an Exchange circuit.

FIG. 7 shows an arrangement in accordance with the invention for using a pair of registers to perform a direct Exchange function. In this figure, Y triggers 12 and X triggers 14 are shown interconnected by pairs in a manner to cause the transfer of the state of each trigger to the remaining one of a pair upon application of an Exchange pulse along a lead 63. In the depicted circuit, each binary 1 output of a trigger controls the set input of the other trigger in the same stage and each binary 0 output of a trigger controls the reset input of the other trigger in that stage. Operation of the circuit in response to an Exchange pulse is in accordance with the following table:

TABLE IV

| | | | | |
|---|---|---|---|---|
| Y | 0 | 0 | 1 | 1 |
| X | 0 | 1 | 0 | 1 |
| Y | 0 | 1 | 0 | 1 |
| X | 0 | 0 | 1 | 1 |

It may be seen that the result is a bilateral exchange within each stage of the respective stored binary states, and the operation is extended for as many register stages as are provided. Previously known arrangements for performing a similar function usually involve only a move, rather than an exchange of numbers. That is, in the usual "move" instructions such as "move A to B," A replaces B, but B does not replace A and is thus lost from the registers. By contrast, the present arrangement provides a true exchange in which A replaces B and B replaces A.

Figure 8:
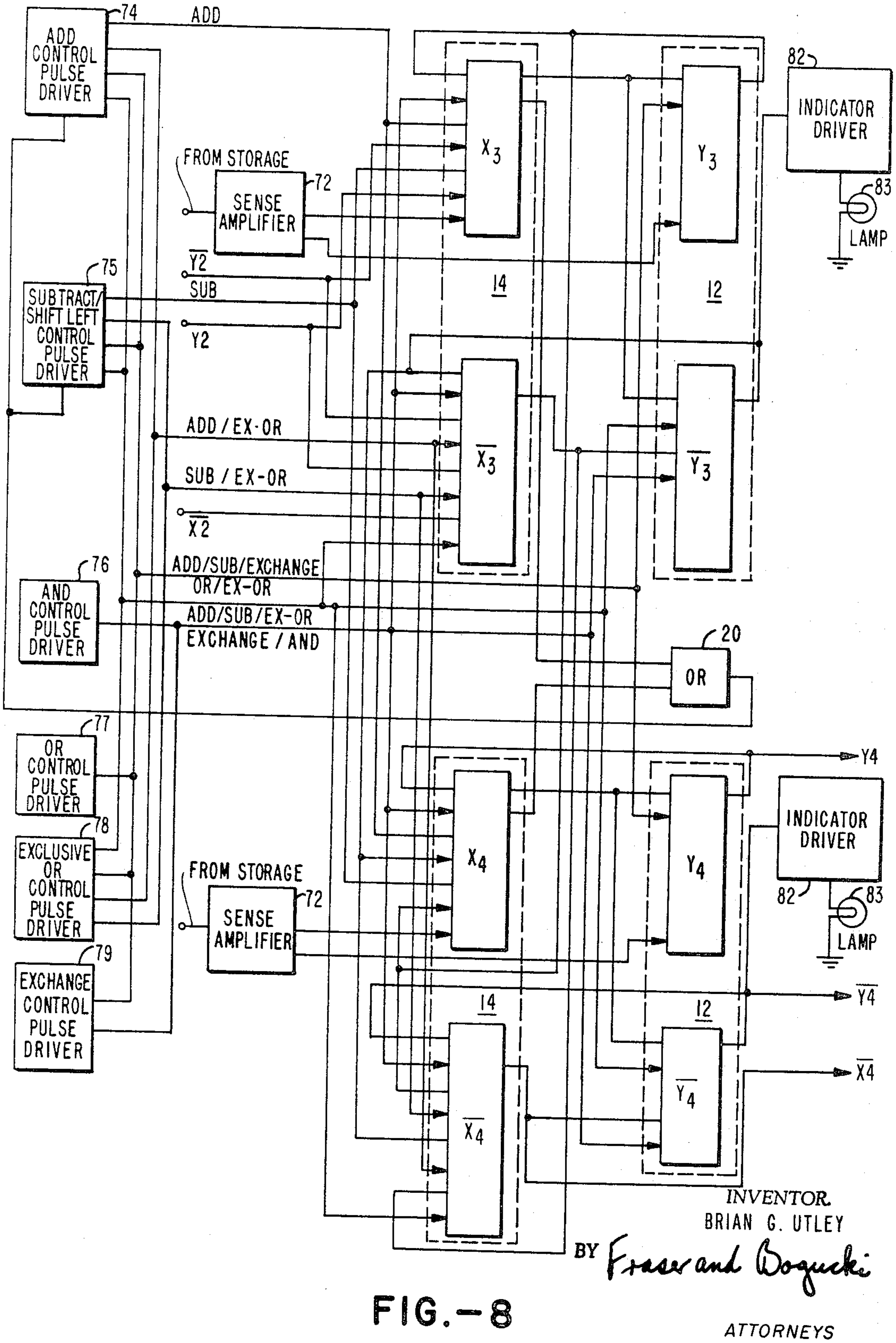
FIG. 8 is a block diagram of a composite circuit arrangement in accordance with the invention incorporating the operations of the circuits of FIGS. 2–7.

FIG. 8 represents in block diagram form a composite circuit including the configurations represented in FIGS. 2–7 for performing the arithmetic operations of addition and subtraction, and the logic functions of AND, OR, Exclusive OR, Shift Left, and Exchange with respect to a pair of binary numbers. The diagram of FIG. 8 represents the third and fourth stages of a portion of a composite circuit of *n* stages. For convenience of representation, the X and Y triggers, 14 and 12 respectively, have been divided into binary 1 and binary 0 blocks corresponding to $X_n$, $Y_n$ and $\overline{X}_n$, $\overline{Y}_n$, respectively. Sense amplifiers 72 are shown coupled through ungated inputs to the respective $X_n$ and $Y_n$ stages for the purpose of setting the respective X and Y triggers in binary states corresponding to the binary numbers, received from storage, which are to be operated upon. With the exception of the ungated inputs from the sense amplifiers 72, each input designated by an arrowhead on the left-hand side of one of the trigger blocks represents an AC input controlled by the state of the signal applied on the associated lead immediately above the arrowhead. Control signals are provided by associated control pulse drivers, variously designated the ADD control pulse driver 74, the SUBTRACT/Shift Left control pulse driver 75, the AND control pulse driver 76, the OR control pulse driver 77, the Exclusive OR control pulse driver 78, and the Exchange control pulse driver 79. Output circuitry is coupled as shown to provide suitable indications of the states of the various register stages. This output circuitry comprises an indicator driver 82 and an associated lamp 83. The indicator driver 82 is coupled to receive the binary 0 output of its associated Y trigger 12 (i.e., $\overline{Y}$) and invert this signal so as to drive the indicator lamp 83 to provide an indication of the state of the Y register for display to an operator. In addition, a suppress advance signal gate 20 is provided to establish a blocking signal for the control pulse drivers 74, 75 in the manner indicated in FIGS. 1–3.

For ease of understanding the operation of the composite circuit of FIG. 8, reference is made to FIGS. 2–7 in which the various functions of addition, substraction, OR, Exclusive OR, AND, Shift Left and Exchange are separately set forth. The composite circuit of FIG. 8 is operated in accordance with the various rules as follows in order to achieve the designated functions (the actual step being performed in accordance with the rule is indicated):

ADD $X_n=1$, binary change $Y_n$ (Partial Sum)
$Y_n$ change from 1 to 0, set $X_{n+1}=1$ (Carry Generate and Store)
$X_n$ or $Y_n=0$, set $X_{n+1}=0$ (Carry Reset)

SUBTRACT $X_n=1$, binary change $Y_n$ (Partial Difference)
$Y_n$ change from 0 to 1, set $X_{n+1}=1$ (Borrow Generate and Store)

$$\left.\begin{matrix} X_n=0 \\ Y_n=1 \end{matrix}\right\} \text{ set } X_{n+1}=0 \text{ (Borrow Reset)}$$

AND $X_n=0$, set $Y_n=0$ ($\overline{\text{AND}}$ result)

EXCHANGE $X_n=1$, set $Y_n=1$ (X to Y)
$X_n=0$, set $Y_n=0$ ($\overline{X}$ to $\overline{Y}$)
$Y_n=1$, set $X_n=1$ (Y to X)
$Y_n=0$, set $X_n=0$ ($\overline{Y}$ to $\overline{X}$)

OR $X_n=1$, set $Y_n=1$ (OR result when $X=1$)

EXCLUSIVE OR $X_n=1$, binary change $Y_n$ (Exclusive OR)

$$\left.\begin{matrix} X_n \text{ or } Y_n=0 \\ X_n=1 \end{matrix}\right\} \text{ set } X_{n+1}=0 \text{ (X Reset)}$$

SHIFT LEFT (This is SUBTRACT with only one borrow cycle and begins with each $Y_n=0$)

$X_n=1$, binary change $Y_n$ (Partial Difference)
$Y_n$ change from 0 to 1, set $X_{n+1}=1$ (Borrow)
$X_n=0$, set $X_{n+1}=0$ (Borrow Reset)

Additional Shift Left functions can be realized by resetting all $Y_n$ to 0 and repeating the cycle. Alternatively, the Shift Left function can be followed by the Exchange function to display the number in the Y register as is customary.

It may readily be seen that the composite circuit illustrated in FIG. 8 represents a substantial simplification of circuitry as contrasted with the special purpose circuits which have been employed in the prior art for performing the various functions described. For example, when the composite circuit of FIG. 8 is compared with what are independently set forth as special purpose circuits in FIGS. 2–7, it is apparent that the only additions over the set of registers and display equipment necessary for a single purpose circuit are the extra control pulse drivers and various connections which are included to achieve the composite circuit of FIG. 8 having the multipurpose capability described above.

While the invention has been particularly shown and described with reference to preferred embodiments thereof, it will be understood by those skilled in the art that various changes in form and details may be made therein without departing from the spirit and scope of the invention.

I claim:

1. A parallel binary adder comprising first and second registers for storing two binary numbers, means for generating a partial sum of two binary numbers stored in said registers with said partial binary sum being stored in said first register, means for generating carries left from a partial summing operation with the carries being stored in said second register, means for applying repetitive Add Signals to control said adder to repeat the partial summing operation until blocked, and means for providing a blocking signal to the Add Signal applying means when all of the carries are zero.

2. A parallel binary adder comprising first and second registers for storing two binary numbers, means for generating a partial sum of two binary numbers stored in said registers with said partial binary sum being stored in said first register, means for generating carries left from a partial summing operation with the carries being stored in said second register, and means for applying Add Signals to control said adder to repeat the partial summing operation until the carries are eliminated, said carries generating means comprising a direct connection from the binary zero output of the first register to a carry-in input of the second register.

3. A parallel binary adder comprising first and second registers for storing two binary numbers, means for generating a partial sum of two binary numbers stored in said registers with said partial binary sum being stored in said first register, means for generating carries left from a partial summing operation with the carries being stored in said second register, means for applying repetitive Add Signals to control said adder to repeat the partial summing operation until blocked, and means for providing a blocking signal when all of the carries are zero, said carries generating means comprising a direct connection from the binary zero output of the first register to a carry-in input of the second register.

4. A parallel binary adder comprising a first register to store an augend and thereafter accumulate partial sums, a second register to store an addend and subsequent carry signals, a source of add signals coupled to cause the addition of a number in the second register to a number in the first register, gating means to provide carry signals in the second register in accordance with the contents of the first and second registers at a preceding cycle and to clear the stages of the second register to which no carry signals are applied, and means for causing the add signals to be generated repetitively until the second register is cleared.

5. A parallel binary adder comprising a first register to store an augend and thereafter accumulate partial sums, a second register to store an addend and subsequent carry signals, a source of add signals coupled to cause the addition of a number in the second register to a number in the first register, means to provide carry signals in the second register in response to a change of the first register from a binary one state to a binary zero state, and means for causing the add signals to be generated repetitively until the second register is cleared.

6. A parallel binary subtracter comprising a first register to store a minuend and to accumulate partial differences, a second register to store a subtrahend and subsequent borrows, transfer means to subtract a subtrahend and subsequent borrows from the first register and also to clear or store borrows in said second register in accordance with partial subtraction steps, and means for operating the transfer means until subtraction is complete and said second register is cleared.

7. A parallel binary subtracter comprising a first register to store a minuend and to accumulate partial differences, a second register to store a subtrahend and subsequent borrows, transfer means to subtract a subtrahend and subsequent borrows from the first register and also to clear or store borrows in said second register in accordance with partial subtraction steps, means for operating the transfer means repetitively, and means for generating a blocking signal to block the operating means when the second register is cleared.

8. A composite circuit for performing both arithmetic and logic functions comprising first and second registers, means for storing binary numbers in said registers, means interconnecting said first and second registers in accordance with the arithmetic and logic functions to be performed, means for cyclically controlling said first and second registers in accordance with a selected function to be performed, and means for blocking the cyclical control means upon completion of the selected function.

9. A composite circuit in accordance with claim 8 further comprising indicating means for indicating the state of the first register.

10. A composite circuit in accordance with claim 8 wherein said functions include addition, subtraction, AND, OR, Exclusive OR, Exchange and binary Shift Left operations.

11. A parallel binary subtracter comprising means for receiving repetitive control pulses to time the operation of the subtracter, a first register to store a minuend and to accumulate partial differences, a second register to store a subtrahend and subsequent borrows, transfer means to subtract a subtrahend and subsequent borrows from the first register and also to clear or store borrows in said second register in accordance with successive partial subtractions, and means for blocking the control pulses when the second register is cleared.

References Cited

UNITED STATES PATENTS

| | | | |
|---|---|---|---|
| 3,249,747 | 5/1966 | Booher | 235—175 |
| 3,320,410 | 5/1967 | Barrett et al. | 235—175 |
| 2,936,116 | 5/1960 | Adamson et al. | 235—173 X |
| 3,008,639 | 11/1961 | Dickinson | 235—173 |
| 3,028,088 | 4/1962 | Dunham | 235—175 X |
| 3,056,552 | 10/1962 | Wagner | 235—175 |
| 3,235,718 | 2/1966 | Walendziewicz | 235—172 X |

MARTIN P. HARTMAN, *Primary Examiner.*

U.S. Cl. X.R.

235—164